R. R. GIBSON.
SEED PLANTER.
APPLICATION FILED JAN. 31, 1913.

1,069,083.

Patented July 29, 1913.

WITNESSES:
J. C. Ledbetter
Jack A. Schley

INVENTOR
R. R. Gibson.
BY John M. Spellman
ATTORNEY

UNITED STATES PATENT OFFICE.

RUPERT R. GIBSON, OF WACO, TEXAS.

SEED-PLANTER.

1,069,083.

Specification of Letters Patent. Patented July 29, 1913.

Application filed January 31, 1913. Serial No. 745,397.

*To all whom it may concern:*

Be it known that I, RUPERT R. GIBSON, a citizen of the United States, residing at Waco, in the county of McLennan and State of Texas, have invented certain new and useful Improvements in Seed-Planters, of which the following is a specification.

My invention pertains to certain new and useful improvements in seed planters of the revolving distributer type.

The object of the invention is to provide a planter having a revolving seed distributing drum provided with radial slots in which radially moving plungers are arranged, and so operated that at predetermined points seeds are received in the pockets and subsequently ejected therefrom.

A further object is to provide a particular form of mechanism for performing the function just described.

Another object of the invention is to provide in combination with the said distributing drum, a device preventing overloading of the seed pockets and assuring a uniform load.

A still further object of the invention is to provide a device of the character described that will be strong, efficient, and simple and comparatively inexpensive to construct, also one in which the several parts will not be likely to get out of working order.

Figure 1:
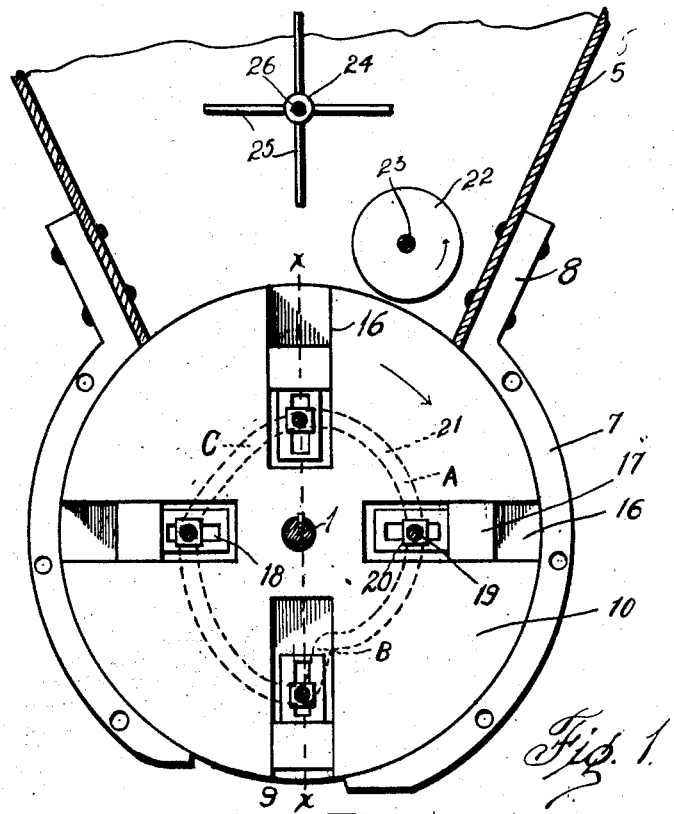
Figure 2:
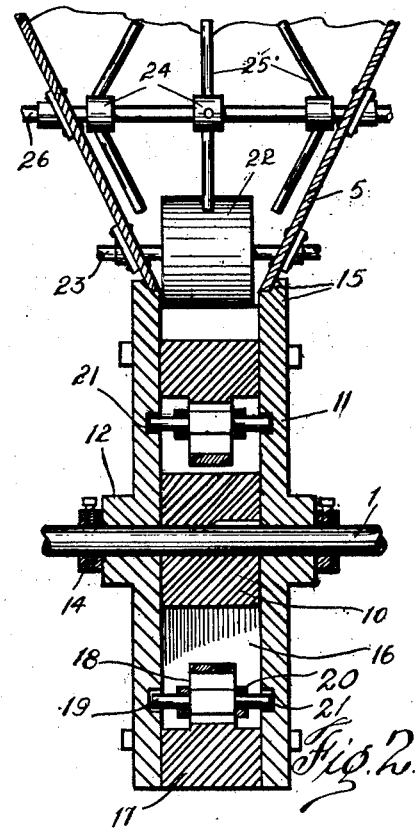
Figure 4:
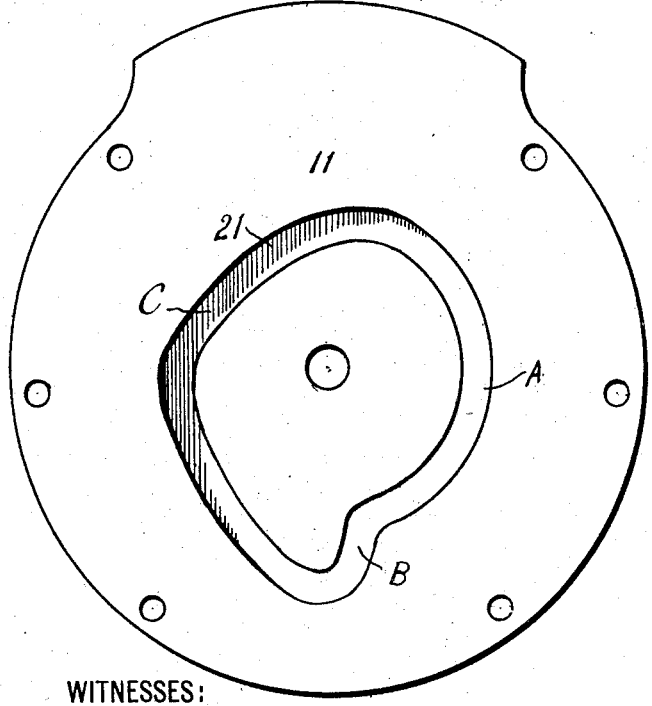
Figure 3:
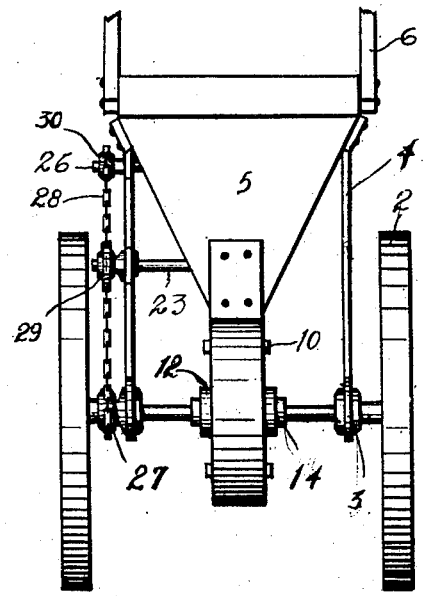

With the above and other objects in view the invention has relation to certain novel features of construction and operation, an example of which is described in the following specification and illustrated in the accompanying drawings, wherein;

Figure 1 is a side elevation of the said drum and stripping roller, component parts being illustrated in section, Fig. 2 is a vertical sectional view on the line x—x of Fig. 1, Fig. 3 is an end elevation of the planter, and Fig. 4 is a view in elevation of the inner side of one of the drum plates.

In the drawings the numeral 1 designates an axle having ground wheels 2 fastened on its extremities. This axle is rotatably confined in bearing boxes 3 on the lower ends of standards 4 supporting a seed hopper 5 at their upper ends. Handles 6 are suitably secured to the hopper.

Curved hangers 7 are provided at their upper ends with sharply bent ears 8 attached to the front and rear sides of the hopper. The hangers have their lower ends beveled and are separated sufficiently to form a seed discharge opening 9. These hangers are combined to form a ring like casing or support and are curved to conform to the peripheral contour of a seed drum 10 which is keyed on the axle so as to revolve in the hangers in close proximity to the inner walls thereof.

The hangers have a width approximately the same as that of the drum, and cam closure plates 11 are secured to the hangers so as to inclose the drum and provide a working fit therebetween. The plates are removably secured to the hangers and have bearing bosses 12 through which the axle extends. Bearing collars 14 fastened on the axle impinge the bosses and retain the drum in free operating relation to the plates 11 which are fastened to the hangers. The lower edges of the hopper are curved contiguous to the drum and are received in the shouldered portions 15 of the plates 11 as shown in Fig. 2.

The drum 10 is cut out transversely to form a plurality of radial slots 16 in which plungers 17 are arranged to operate radially of the drum as the same is revolved. These slots 16 are substantially square in plan, two walls being formed by the drum and the side walls being provided by the plates 11. The heads of the plungers have substantially the same area as the slots and thus fit snugly therein. Each plunger has a slotted stem 18 extending in the slot 16 from the plunger head toward the axle 1. In the slotted portion of each stem 18, the squared portion of a follower pin 19 is secured. These pins project laterally on each side of the stems and are fastened in place by nuts 20 threaded thereon and impinging the sides of the stems. The pins 19 project into cam grooves or guideways 21 provided in the inner faces of the plates 11. The opposed grooves 21 correspond and when the drum 10 is revolved the pins 19 follow the contour of the cam grooves whereby the plungers 17 are moved radially of the said drum in the slots 16. The specific contour of the grooves controls the movement of the plungers.

By observing Fig. 1 it will be seen that when a plunger is under the hopper 5 it is retracted or drawn into the slot 16 sufficiently to form a seed pocket at the upper end of the slot. It is obvious that this formed pocket may be deepened or made more shallow by removing one of the plates 11 and adjusting the plungers 17 on the pins 19 radially of the slots 16.

In the hopper at the forward side, a smooth faced roller 22 is mounted transversely thereof on a shaft 23 having bearings in the walls of the hopper 5. An agitator 24 comprising radial fingers 25 is mounted in the hopper above the drum 10 on a shaft 26 supported transversely of the hopper. As shown in Fig. 3. A sprocket 27 is secured on the axle 1 and drives an endless chain 28 passing about sprockets 29 and 30 secured respectively on the shafts 23 and 26 whereby the roller 22 and agitator 24 are revolved.

As shown in Fig. 1 each cam guideway 21 has a portion A concentric to the axle 1. This portion A extends from a point approximately under the roller 21 to a point approximately over the discharge opening 9. While the pins are traveling in the portion A, the plungers remain relatively fixed radially of the slots. The portion A sharply merges into a radially off-set portion B whereby the pins 19 are carried outward and the plungers moved outward radially whereby the seeds are ejected through the opening 9. From the portion B, each groove 21 has a portion gradually swinging outward and finally merging into the portion A. This portion C is so arranged that a maximum loading point is established just as the plungers are brought under the hopper so the pockets can receive the seeds, and a gradual rise is made from this point to the merging point between the portions A and C under the roller 22, which latter point constitutes a minimum loading point.

It is obvious that at the maximum loading point, the pockets are deepest and provision is thus made for receiving more seeds than are required, but the gradual rise of the portions C to the roller 22 will raise the plungers 17 and expel surplus seeds. In this way a full load is assured. The roller 22 prevents overloading of the pockets and packs the seeds thereinto thus assuring a full load.

In operating the planter, the same is propelled along a furrow which is suitably opened. The drum 10 will be revolved by the axle and as the pockets pass under the hopper 5 they will be loaded with seeds which are kept in a flowing condition by the revolution of the fingered agitator 24, the roller 22 being revolved will prevent overloading of the pockets and will pack the seed therein. Said pockets being loaded will remain so while the pins 19 are following in the portions A of the grooves 21, until the portions B are encountered when said pins will suddenly take the off-set contour of the grooves causing an outward radial displacement of the plungers 17 thus ejecting the seeds through the opening 9 into the furrow.

It is obvious that the intervals between the discharges of seeds through the opening 9 may be controlled by "timing" the gearing and changing the sprockets; also the quantity of seeds discharged from each pocket may be governed by adjusting the plungers 17 on the pins 19 as previously described.

It is apparent that the seeds will be planted at regular intervals in predetermined quantities and the number dropped at each discharge will be ejected in collected order and not scattered.

What I claim, is:

1. The combination in a seed planter, of an axle, ground wheels fixed on the axle, a seed drum fixed on the axle and having a plurality of equidistant radial slots, plungers mounted in the drum slots, transverse pins carried by the plungers, a casing in which the drum is disposed, a hopper over the drum and from which the casing is suspended, cam side plates receiving the axle and secured to the casing, said casing having a discharge opening in the path of the slots of the drum, said plates having cam guideways in which the pins of the plungers follow and provided with radial off-set portions relatively adjacent the discharge opening of the casing, and a packing roller mounted in the hopper at one side and in juxtaposition to the periphery of the drum.

2. In a seed planter, the combination with a revolving drum, a plurality of plungers movable radially in the drum and having laterally projecting members, a hopper arranged above the drum, and a casing surrounding the drum, of side plates at each side of the drum, and each plate provided with a cam groove having a concentric portion merging into a portion offset outward radially of the plate and this latter groove portion merging into a portion which terminates in the concentric portion and has its contour immediately preceding the said concentric portion directed gradually outward from the center of the plate.

3. The combination in a seed planter, of an axle, ground wheels fixed on the axle, a seed drum fixed on the axle and having a plurality of equidistant radial slots, plungers mounted in the drum slots, stems extending from the plungers and provided with slots, transverse pins mounted in the slots of the stems, means for adjustably fastening the pins in the slots of the plungers, a casing in which the drum is disposed, a hopper over the drum and from which the casing is suspended, cam side plates receiving the axle and secured to the casing, said casing having a discharge opening in the path of the slots of the drum, said plates having cam guideways in which the pins of the plungers follow and provided with radial off-set portions relatively adjacent the discharge opening of the casing, and a packing roller mounted in the hopper at one side and in juxtaposition to the periphery of the drum.

In testimony whereof I have signed my name to this specification in the presence of two subscribing witnesses.

RUPERT R. GIBSON.

Witnesses:
  LIZZIE AKIN,
  E. J. SUTHERLAND.